United States Patent
Gul et al.

(10) Patent No.: US 11,142,713 B2
(45) Date of Patent: Oct. 12, 2021

(54) ASPHALTENE-INHIBITING METHOD USING AROMATIC POLYMER COMPOSITIONS

(71) Applicant: Ecolab USA Inc., St. Paul, MN (US)

(72) Inventors: Omer Gul, Rosenberg, TX (US); Michael L. Braden, Huntsville, TX (US); Ashish Dhawan, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 77 days.

(21) Appl. No.: 16/584,440

(22) Filed: Sep. 26, 2019

(65) Prior Publication Data

US 2020/0102513 A1   Apr. 2, 2020

Related U.S. Application Data

(60) Provisional application No. 62/737,520, filed on Sep. 27, 2018.

(51) Int. Cl.
*C10G 75/04* (2006.01)
*C08G 8/10* (2006.01)

(52) U.S. Cl.
CPC ............. *C10G 75/04* (2013.01); *C08G 8/10* (2013.01); *C10G 2300/80* (2013.01)

(58) Field of Classification Search
None
See application file for complete search history.

(56) References Cited

U.S. PATENT DOCUMENTS

| | | | |
|---|---|---|---|
| 3,350,353 A | 10/1967 | Alvey | |
| 3,624,019 A | 11/1971 | Anderson et al. | |
| 3,734,873 A | 5/1973 | Anderson et al. | |
| 3,947,425 A | 3/1976 | Freeman et al. | |
| 4,136,045 A | 1/1979 | Gault et al. | |
| 4,211,862 A | 7/1980 | Pechhold et al. | |
| 4,260,437 A | 4/1981 | Nakagawa et al. | |
| 4,378,453 A | 3/1983 | Yotsumoto et al. | |
| 4,506,051 A | 3/1985 | Rance | |
| 4,525,496 A | 6/1985 | Adaway et al. | |
| 4,537,701 A | 8/1985 | Oppenlaender et al. | |
| 4,575,521 A | 3/1986 | Cote et al. | |
| 4,649,102 A | 3/1987 | Mukunoki et al. | |
| 4,737,265 A | 4/1988 | Merchant, Jr. et al. | |
| 4,848,442 A | 7/1989 | Iyer et al. | |
| 4,918,123 A | 4/1990 | Yang et al. | |
| 5,021,498 A | 6/1991 | Stephenson et al. | |
| 5,073,248 A * | 12/1991 | Stephenson ............ | C09K 8/524 208/22 |
| 5,207,954 A | 5/1993 | Lewis et al. | |
| 5,314,955 A | 5/1994 | Halladay | |
| 5,362,615 A | 11/1994 | Hagemann et al. | |
| 5,779,632 A | 7/1998 | Dietz | |
| 5,789,472 A | 8/1998 | Ryan et al. | |
| 5,945,494 A | 8/1999 | Neff et al. | |
| 5,961,840 A | 10/1999 | Ryles et al. | |
| 5,973,064 A | 10/1999 | Zhao et al. | |
| 5,981,622 A | 11/1999 | Geoffrey | |
| 5,998,530 A | 12/1999 | Krull et al. | |
| 6,102,999 A | 8/2000 | Cobb, III et al. | |
| 6,120,678 A | 9/2000 | Stephenson et al. | |
| 6,268,406 B1 | 7/2001 | Chatterji et al. | |
| 6,294,093 B1 | 9/2001 | Selvarajan et al. | |
| 6,313,367 B1 | 11/2001 | Breen | |
| 6,316,583 B1 | 11/2001 | Gerber | |
| 6,369,182 B1 | 4/2002 | Whipple et al. | |
| 6,465,528 B1 | 10/2002 | Holtrup et al. | |
| 6,908,962 B1 | 6/2005 | Frankenbach et al. | |
| 7,429,625 B2 | 9/2008 | Harrington et al. | |
| 7,951,857 B2 | 5/2011 | Crews et al. | |
| 8,840,820 B2 | 9/2014 | Yancey et al. | |
| 9,034,093 B2 | 5/2015 | Stark et al. | |
| 9,464,193 B2 | 10/2016 | Hagiopol et al. | |
| 2004/0063597 A1 | 4/2004 | Adair et al. | |
| 2005/0098759 A1 | 5/2005 | Frankenbach et al. | |
| 2006/0111508 A1 | 5/2006 | Dailey, Jr. | |
| 2007/0062102 A1 | 3/2007 | Krull et al. | |
| 2007/0221539 A1 | 9/2007 | Cohrs et al. | |
| 2009/0312476 A1 | 12/2009 | Korth et al. | |
| 2010/0151396 A1 | 6/2010 | Papachristos et al. | |

(Continued)

FOREIGN PATENT DOCUMENTS

| | | |
|---|---|---|
| EP | 0 097 567 A2 | 1/1984 |
| EP | 0 202 780 A2 | 11/1986 |
| EP | 0 222 587 A1 | 5/1987 |
| EP | 0 261 679 A2 | 3/1988 |
| EP | 0 374 458 A2 | 6/1990 |
| GB | 1029501 | 5/1966 |
| GB | 1115611 | 5/1968 |
| GB | 2146260 A | 4/1985 |
| WO | 2009/013536 A2 | 1/2009 |
| WO | 2013/112503 A1 | 8/2013 |
| WO | 2017/120455 A1 | 7/2017 |

OTHER PUBLICATIONS

Al-Sabagh, Ahmed M. et al., Investigation of Kinetic and Rheological Properties for the Demulsification Process, Egyptian Journal of Petroleum (2013) 22, pp. 117-127.
Downs, H. H. et al., Enhanced Oil Recovery by Wettability Alteration, Chapter 32 (1989) American Chemical Society, 19 pages.
Hauck, G. et al., Influence of Additives and Surface Topography on the Alignment of Nematic Liquid Crystals, Crystal Res. & Technol. 17 (7) (1982), pp. 865-869.
International Search Report and Written Opinion dated Dec. 16, 2019 relating to PCT Application No. PCT/US2019/053183, 14 pages.

*Primary Examiner* — Derek N Mueller
(74) *Attorney, Agent, or Firm* — Stinson LLP

(57) ABSTRACT

The present invention generally relates to nonylphenol-free alkoxylated 4-(alkyloxy)phenol/aldehyde resins and processes for making alkoxylated 4-(alkyloxy)phenol/aldehyde resins. The invention also relates to methods of breaking emulsions of oil and water comprising the dosing of an effective amount of an emulsion breaker composition into a stable emulsion to destabilize the emulsion, wherein the emulsion breaker composition comprises an alkoxylated 4-(alkyloxy)phenol/aldehyde resin.

20 Claims, No Drawings

(56) References Cited

U.S. PATENT DOCUMENTS

| | | |
|---|---|---|
| 2010/0204351 A1 | 8/2010 | Swedo et al. |
| 2014/0051620 A1 | 2/2014 | Soane et al. |
| 2014/0190692 A1 | 7/2014 | Hibbeler et al. |
| 2015/0150255 A1 | 6/2015 | Lapitsky et al. |
| 2015/0291494 A1 | 10/2015 | Huc et al. |
| 2015/0307788 A1 | 10/2015 | McDaniel et al. |
| 2015/0367307 A1 | 12/2015 | Shen et al. |
| 2016/0017203 A1 | 1/2016 | Frederick et al. |
| 2016/0333252 A1 | 11/2016 | Brinkman et al. |
| 2016/0361699 A1 | 12/2016 | Floyd, III et al. |
| 2017/0037300 A1 | 2/2017 | Li et al. |

\* cited by examiner

ASPHALTENE-INHIBITING METHOD USING AROMATIC POLYMER COMPOSITIONS

CROSS REFERENCE TO RELATED APPLICATIONS

This application claims priority to U.S. Provisional Patent Application Ser. No. 62/737,520 filed on Sep. 27, 2018, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

Polymers and compositions are provided and can be used, for example, in methods of dispersing and/or inhibiting the deposition of asphaltenes found in hydrocarbons using a class of 4-(alkyloxy) phenol/aldehyde polymer resins as asphaltene dispersants/inhibitors.

BACKGROUND OF THE INVENTION

Crude oils are comprised of two major solubility fractions, maltenes and asphaltenes. Maltenes constitute the fraction of oil that is soluble in low molecular mass n-alkane solvents, such as n-pentane, n-hexane and n-heptane. Asphaltenes are defined as the crude oil fraction that is soluble in aromatic solvents and insoluble in low-boiling straight chain alkanes. Asphaltene molecules have complex structures and are typically polar molecules with relatively high molecular weights (approximately 700 to 1,000 g/mol). Asphaltenes can contain carbon, hydrogen, nitrogen, oxygen, and sulfur as well as trace amounts of vanadium and nickel.

Asphaltenes are typically stable under virgin reservoir conditions, but can be destabilized and precipitate from crude oil during production due to changes in temperature, pressure, chemical composition, and shear rate. Asphaltene deposits can occur throughout the production system, from inside the reservoir formation to pumps, tubing, wellheads, safety valves, flow lines, and surface facilities used in the extraction process. Asphaltene deposits can cause production rate decline and other operational problems, such as increased fluid viscosity and density, and stabilization of oil-water emulsions. The nature of asphaltene deposits, which can appear hard and coal-like and tar-like is determined by the composition of the crude oil and the conditions under which precipitation occurred.

Chemical treatment with additives such as dispersants and inhibitors is one of the most commonly adopted control options for the remediation and prevention of asphaltene deposition. Asphaltene inhibitors (AIs) provide real inhibition in that they can shift asphaltene flocculation pressure and prevent aggregation of asphaltene molecules.

Alkylphenol/formaldehyde resins, particularly resins with a nonylphenol moiety in the backbone of the resin, have been used in the industry as asphaltene inhibitors. However, nonylphenols are known to be toxic, specifically as endocrine-hormone disrupters. Thus, there is a need to replace these chemistries with nonylphenol-free alternatives that are more environmentally friendly. It is, therefore, polymers and compositions are provided and can be used, for example, in methods of dispersing asphaltenes and/or inhibiting their deposition using an alkylphenol free formulation such as the resins provided herein.

BRIEF SUMMARY OF THE INVENTION

The polymers and compositions provided can be used in methods for dispersing asphaltenes in an asphaltene-containing hydrocarbon. The method can comprise contacting the asphaltene-containing hydrocarbon with an asphaltene-inhibiting composition comprising a polymer corresponding in structure to Formula 1:

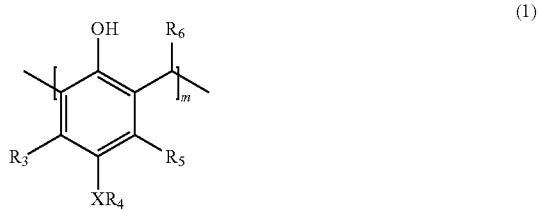

(1)

wherein $R_3$ and $R_5$ are independently hydrogen, $C_1$-$C_{22}$ alkyl, or alkyloxy; $R_4$ is $C_{4-22}$ alkyl; $R_6$ is hydrogen, alkyl, aryl, or arylalkyl; X is —O— or —$NR_8$; $R_8$ is hydrogen or $C_1$-$C_4$ alkyl; and m is an integer from 4 to 75.

The methods can also comprise an asphaltene inhibiting composition comprising a polymer corresponding in structure to Formula 1A:

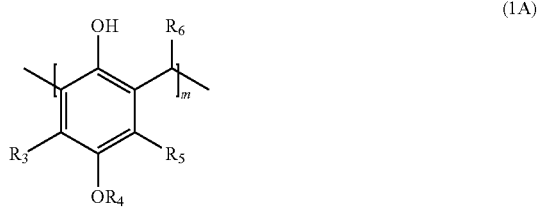

(1A)

wherein $R_3$ and $R_5$ are independently hydrogen, $C_1$-$C_{22}$ alkyl, or alkoxy, $R_4$ is $C_4$-$C_{22}$ alkyl; $R_6$ is hydrogen, alkyl, aryl, or arylalkyl; and m is an integer from 4 to 75.

In a polymer of Formula 1 or 1A, $R_4$ is $C_4$-$C_{16}$ alkyl, $R_4$ is $C_4$-$C_{12}$ alkyl, or $R_4$ is $C_8$-$C_{12}$ alkyl. Preferably, $R_4$ is $C_8$ (e.g., octyl).

Also a polymer of Formula 1 or 1A can have $R_3$ and $R_5$ independently be hydrogen or a $C_1$-$C_6$ alkyl. More preferably, $R_3$ and $R_5$ are independently hydrogen or $C_1$-$C_4$ alkyl. Even more preferably, $R_3$ and $R_5$ are independently hydrogen or methyl. Most preferably, $R_3$ and $R_5$ are hydrogen.

Polymers of Formula 1 or 1A have $R_6$ as hydrogen, methyl, butyl, or benzyl. Preferably, $R_6$ is methyl or hydrogen.

Polymers of Formula 1 can have $R_8$ as hydrogen or methyl. Preferably, $R_8$ is hydrogen.

The polymer of Formula 1 or 1A can have a weight average molecular weight of from about 500 to about 25,000 Daltons; preferably, from about 2,000 to about 10,000 Daltons.

Preferably, the polymer of Formula 1 or 1A has a weight average molecular weight of from about 2,000 to about 10,000 Daltons.

The methods disclosed herein can have the asphaltene-inhibiting composition comprise from about 10 wt. % to about 90 wt. % of the polymer corresponding in structure to Formula 1 and the balance being a hydrophobic solvent.

For the asphaltene-inhibiting compositions, the hydrophobic solvent can comprise toluene, xylene, an ethylbenzene, an aromatic naphtha, a produced hydrocarbon, diesel, kerosene, or a combination thereof.

The asphaltene-inhibiting composition can be contacted with the asphaltene-containing hydrocarbon in an effective amount to disperse asphaltene.

The effective amount of the asphaltene-inhibiting composition can be from about 1 ppm to about 1000 ppm of the polymer corresponding in structure to Formula 1 based on the total amount of a fluid containing the asphaltene-containing hydrocarbon. Preferably, the effective amount of the polymer corresponding in structure to Formula 1 is from about 1 ppm to about 100 ppm.

Other objects and features will be in part apparent and in part pointed out hereinafter.

DETAILED DESCRIPTION OF THE INVENTION

Deposition of various solids from oil field fluids during production can cause wide ranging flow assurance issues. These issues can have significant economic and safety implications. One common deposit type is an asphaltene material, which is a class of crude oil compounds defined by solubility. New and improved solvents and treatments are needed to mitigate agglomeration and deposition of asphaltenes. To that end, the asphaltene-inhibiting compositions provided herein are effective in dispersing asphaltenes and preventing their deposition. Additionally, these 4-(alkyloxy)phenol/aldehyde resins are advantageous due to their decreased toxicity and decreased impact on the environment as compared with resins derived from alkylphenols.

The methods described herein can utilize an oligomer or polymer corresponding in structure to Formula (1):

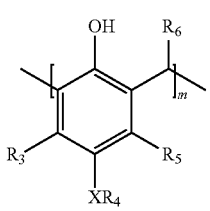

(1)

wherein $R_3$ and $R_5$ are independently hydrogen, $C_1$ to $C_{22}$ alkyl, or alkyloxy; $R_4$ is $C_4$ to $C_{22}$ alkyl; $R_6$ is hydrogen, alkyl, aryl, or arylalkyl; X is —O— or —NR$_8$; $R_8$ is hydrogen or a $C_1$-$C_4$ alkyl and m is an integer from 4 to 75.

The present disclosure is also directed to an oligomer or polymer corresponding in structure to Formula (1A):

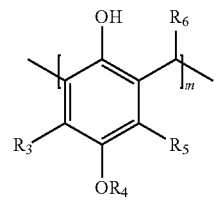

(1A)

wherein $R_3$ and $R_5$ are independently H or $C_1$-$C_{22}$ alkyl or alkyloxy; $R_4$ is $C_4$-$C_{22}$ alkyl; $R_6$ is H, alkyl, aryl, or arylalkyl; and m is an integer from 4 to 75.

The polymer of Formula 1 or 1A can have a weight average molecular weight of from about 500 to about 25,000 Daltons, from about 500 to about 20,000 Daltons, from about 500 to about 15,000, from about 500 to about 10,000 Daltons, from about 1,000 to about 25,000 Daltons, from about 1,000 to about 20,000 Daltons, from about 1,000 to about 15,000, from about 1,000 to about 10,000 Daltons, from about 2,000 to about 25,000 Daltons, from about 2,000 to about 20,000 Daltons, from about 2,000 to about 15,000 Daltons, or from about 2,000 to about 10,000 Daltons.

Preferably, the polymer of Formula 1 or 1A has a weight average molecular weight of from about 2,000 to about 10,000 Daltons.

In a polymer of Formula 1 or 1A, $R_4$ is $C_4$-$C_{16}$ alkyl, $R_4$ is $C_4$-$C_{12}$ alkyl, or $R_4$ is $C_8$-$C_{12}$ alkyl. Preferably, $R_4$ is $C_8$ (e.g., octyl).

Also a polymer of Formula 1 or 1A can have $R_3$ and $R_5$ independently be hydrogen or a $C_1$-$C_6$ alkyl. More preferably, $R_3$ and $R_5$ are independently hydrogen or $C_1$-$C_4$ alkyl. Even more preferably, $R_3$ and $R_5$ are independently hydrogen or methyl. Most preferably, $R_3$ and $R_5$ are hydrogen.

Polymers of Formula 1 or 1A have $R_6$ as hydrogen, methyl, butyl, or benzyl. Preferably, $R_6$ is methyl or hydrogen.

Polymers of Formula 1 can have $R_8$ as hydrogen or methyl. Preferably, $R_8$ is hydrogen.

Also disclosed is a process for the preparation of the polymer corresponding in structure to Formula (1) as described above. The process comprises contacting a compound corresponding in structure to Formula (3):

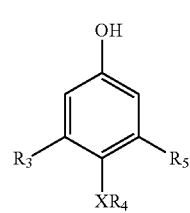

(3)

with an aldehyde to provide a polymer corresponding in structure to Formula (1):

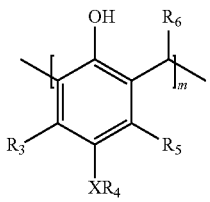

(1)

wherein $R_3$ and $R_5$ are independently H or $C_1$-$C_{22}$ alkyl or alkyloxy; $R_4$ is $C_4$-$C_{22}$ alkyl; $R_6$ is hydrogen, alkyl, aryl, or arylalkyl, X is —O— or —$NR_8$; $R_8$ is hydrogen or $C_1$-$C_4$ alkyl; and m is an integer from 4 to 100.

Further, a process for the preparation of the polymer corresponding in structure to Formula (1A) as described above is disclosed. The process comprises contacting a compound corresponding in structure to Formula (3A):

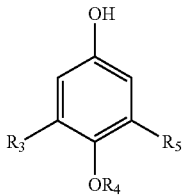

(3A)

with an aldehyde to provide a polymer corresponding in structure to Formula (1A):

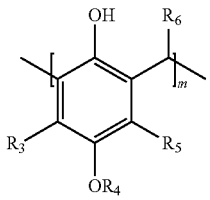

(1A)

wherein $R_3$ and $R_5$ are independently H or $C_1$-$C_{22}$ alkyl or alkyloxy; $R_4$ is $C_4$-$C_{22}$ alkyl; $R_6$ is hydrogen, alkyl, aryl, or arylalkyl, and m is an integer from 4 to 75.

The compound corresponding in structure to Formula (3) can be contacted with the aldehyde in acidic conditions.

The acid can comprise dodecyl benzene sulfonic acid, p-toluene sulfonic acid, or oxalic acid/sodium dioctylsulfosuccinate. The acid can also comprise a Lewis acid such as boron trifluoride etherate.

The process can also further comprise contacting a compound corresponding in structure to Formula (4):

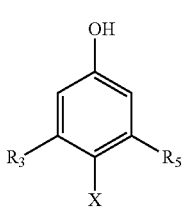

(4)

with a compound corresponding in structure to Formula (2):

$$R_4\text{-L} \quad (2)$$

to provide the compound corresponding in structure to Formula (3), wherein $R_3$ and $R_5$ are independently H or $C_1$-$C_{22}$ alkyl or alkyloxy; $R_4$ is $C_4$-$C_{22}$ alkyl; X is —OH or —$NHR_8$; $R_8$ is hydrogen or $C_1$-$C_4$ alkyl; and L is hydroxy or halide.

The halide can be bromine, chlorine, or iodine. The compound corresponding in structure to Formula (4) can be contacted with a compound corresponding in structure to Formula (2) in basic conditions. The base can comprise potassium hydroxide, sodium hydroxide, lithium hydroxide, potassium carbonate, or sodium carbonate.

The aldehyde can be paraformaldehyde, formaldehyde, benzaldehyde, or vanillin.

Additionally, the disclosure includes a method of dispersing asphaltene in an asphaltene-containing hydrocarbon comprising contacting the asphaltene-containing hydrocarbon with an asphaltene-inhibiting composition comprising a polymer corresponding in structure to Formula 1 or 1A, as defined above. The method can further comprise inhibiting the deposition of asphaltenes on a surface.

The asphaltene dispersants, having structures corresponding to Formulae 1 and 1A, can be prepared as compositions for use as asphaltene treatments. Accordingly, a method of the invention includes dispersing asphaltene in an asphaltene-containing hydrocarbon, the method including adding to the asphaltene-containing hydrocarbon an effective amount of a composition of the invention.

The compositions can also prevent asphaltene deposition. Asphaltene deposition can occur onto any surface involved in the production, extraction and/or refinement of crude oil. For example, the surface can comprise a formation, a pump, a tube, a wellhead, a valve (e.g., safety valve), a flow line, and/or a surface facility used in extraction.

Asphaltene precipitation can be caused by a number of factors including changes in pressure, temperature and composition. Frequently asphaltene precipitation is induced when pressures inside the reservoir decrease and/or oil is mixed with injected solvent (e.g., in improved oil recovery processes), or blending with a highly paraffinic material. Other processes that can induce precipitation in the near wellbore region include drilling, completion, acid stimulation, and hydraulic fracturing activities.

The compositions can be administered in several ways. The compositions can be used alone or blended with additional asphaltene dispersants. An asphaltene dispersing solution composition of the invention may include about 1 wt. % actives to about 100 wt. % actives, about 1 wt. % actives to about 90 wt. % actives, about 1 wt. % actives to about 80 wt. % actives, about 1 wt. % actives to about 70 wt. % actives, about 1 wt. % actives to about 60 wt. % actives, about 1 wt. % actives to about 50 wt. % actives, about 5 wt. % actives to about 100 wt. % actives, about 5 wt. % actives to about 90 wt. % actives, about 5 wt. % actives to about 80 wt. % actives, about 5 wt. % actives to about 70 wt. % actives, about 5 wt. % actives to about 60 wt. % actives, about 5 wt. % actives to about 50 wt. % actives, about 10 wt. % actives to about 100 wt. % actives, about 10 wt. % actives to about 90 wt. % actives, about 10 wt. % actives to about 80 wt. % actives, about 10 wt. % actives to about 70 wt. % actives, about 10 wt. % actives to about 60 wt. % actives, or about 10 wt. % actives to about 50 wt. % actives.

In particular, the asphaltene-inhibiting composition can comprise from about 10 wt. % to about 90 wt. % of the polymer corresponding in structure to Formula 1 and the balance of the composition being a hydrophobic solvent.

The hydrophobic solvent can comprise toluene, xylene, an ethylbenzene, an aromatic naphtha, a produced hydrocarbon, diesel, kerosene, or a combination thereof.

The effective amount of the asphaltene-inhibiting composition can be from about 1 ppm to about 1000 ppm of the polymer corresponding in structure to Formula 1 based on the total amount of a fluid containing the asphaltene-containing hydrocarbon. Preferably, the effective amount of the polymer corresponding in structure to Formula 1 is from about 1 ppm to about 900 ppm, from about 1 ppm to about 800 ppm, from about 1 ppm to about 700 ppm, from about 1 ppm to about 600 ppm, or from about 1 ppm to about 500 ppm. Further, the effective amount of the polymer corresponding in structure to Formula 1 can be from about 1 ppm to about 250 ppm, from about 1 ppm to about 200 ppm, or from about 1 ppm to about 100 ppm. Most preferably the effective amount of the polymer corresponding in structure to Formula 1 is from about 1 ppm to about 100 ppm.

Further, in the methods, the asphaltene-inhibiting composition can comprise an effective amount of the polymer corresponding in structure to Formula 1 and a component selected from the group consisting of a corrosion inhibitor, an organic solvent, an asphaltene inhibitor, a paraffin inhibitor, a scale inhibitor, an emulsifier, a water clarifier, a dispersant, an emulsion breaker, a reverse emulsion breaker, a gas hydrate inhibitor, a biocide, a pH modifier, a surfactant, and a combination thereof.

The asphaltene-inhibiting composition can comprise from about 10 to about 90 wt. % of a polymer corresponding in structure to Formula 1 and from about 10 to about 80 wt. % of the component, preferably from about 50 to about 90 wt. % of one or more a polymer corresponding in structure to Formula 1 and from about 10 to about 50 wt. % of the component, and more preferably from about 65 to about 85 wt. % of one or more polymers corresponding in structure to Formula 1 and from about 15 to about 35 wt. % of the component.

The component of the anti-corrosion composition can comprise water or an organic solvent. The composition can comprise from about 1 to 80 wt. %, from about 5 to 50 wt. %, or from about 10 to 35 wt. % of the water or the one or more organic solvents, based on total weight of the composition. The organic solvent can comprise an alcohol, a hydrocarbon, a ketone, an ether, an alkylene glycol, a glycol ether, an amide, a nitrile, a sulfoxide, an ester, or a combination thereof. Examples of suitable organic solvents include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof.

The component of the anti-corrosion composition can comprise a corrosion inhibitor. The composition can comprise from about 0.1 to 20 wt. %, 0.1 to 10 wt. %, or 0.1 to 5 wt. % of the corrosion inhibitors, based on total weight of the composition. A composition can comprise from 0.1 to 10 percent by weight of the corrosion inhibitors, based on total weight of the composition. The composition can comprise 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, 10.5 wt %, 11.0 wt %, 11.5 wt %, 12.0 wt %, 12.5 wt %, 13.0 wt %, 13.5 wt %, 14.0 wt %, 14.5 wt %, or 15.0 wt % by weight of the corrosion inhibitors, based on total weight of the composition. Each system can have its own requirements, and the weight percent of one or more additional corrosion inhibitors in the composition can vary with the system in which it is used.

The corrosion inhibitor can comprise an imidazoline compound, a quaternary ammonium compound, a pyridinium compound, or a combination thereof.

The corrosion inhibitor component can comprise an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (I) or an imidazoline derivative. Representative imidazoline derivatives include an imidazolinium compound of Formula (II) or a bis-quaternized compound of Formula (III).

The corrosion inhibitor component can include an imidazoline of Formula (I):

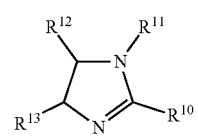

(I)

wherein $R^{10}$ is a $C_1$-$C_{20}$ alkyl or a $C_1$-$C_{20}$ alkoxyalkyl group; $R^{11}$ is hydrogen, $C_1$-$C_6$ alkyl, $C_1$-$C_6$ hydroxyalkyl, or $C_1$-$C_6$ arylalkyl; and $R^{12}$ and $R^{13}$ are independently hydrogen or a $C_1$-$C_6$ alkyl group. Preferably, the imidazoline includes an $R^{10}$ which is the alkyl mixture typical in tall oil fatty acid (TOFA), and $R_{11}$, $R_{12}$ and $R^{13}$ are each hydrogen.

The corrosion inhibitor component can include an imidazolinium compound of Formula (II):

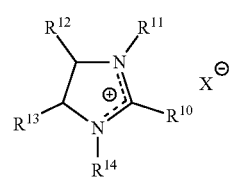

(II)

wherein $R^{10}$ is a $C_1$-$C_{20}$ alkyl or a $C_1$-$C_{20}$ alkoxyalkyl group; $R^{11}$ and $R^{14}$ are independently hydrogen, $C_1$-$C_6$ alkyl, $C_1$-$C_6$ hydroxyalkyl, or $C_1$-$C_6$ arylalkyl; $R^{12}$ and $R^{13}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The corrosion inhibitor can comprise a bis-quaternized compound having the formula (III):

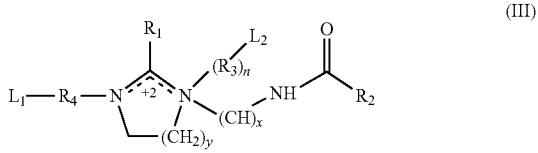

(III)

wherein $R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —$SO_3H$, —$PO_3H_2$, —$COOR_5$, —$CONH_2$, —$CONHR_5$, or —CON$(R_5)_2$; $R_5$ is each independently a branched or unbranched alkyl, aryl, alkylaryl, alkylheteroaryl, cycloalkyl, or heteroaryl group having from 1 to about 10 carbon atoms; n is 0 or 1, and when n is 0, $L_2$ is absent or H; x is from 1 to about 10; and y is from 1 to about 5. Preferably, $R_1$ and $R_2$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R_3$ and $R_4$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —$C_2H_2$—; $L_1$ is —COOH, —$SO_3H$, or —$PO_3H_2$; and $L_2$ is absent, H, —COOH, —$SO_3H$, or —$PO_3H_2$. For example, $R_1$ and $R_2$ can be derived from a mixture of tall oil fatty acids and are predominantly a mixture of $C_{17}H_{33}$ and $C_{17}H_{31}$ or can be $C_{16}$-$C_{18}$ alkyl; $R_3$ and $R_4$ can be $C_2$-$C_3$ alkylene such as —$C_2H_2$—; n is 1 and $L_2$ is —COOH or n is 0 and $L_2$ is absent or H; x is 2; y is 1; $R_3$ and $R_4$ are —$C_2H_2$—; and $L_1$ is —COOH.

It should be appreciated that the number of carbon atoms specified for each group of formula (III) refers to the main chain of carbon atoms and does not include carbon atoms that may be contributed by substituents.

The corrosion inhibitor can comprise a bis-quaternized imidazoline compound having the formula (III) wherein $R_1$ and $R_2$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R_4$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is —COOH, —$SO_3H$, or —$PO_3H_2$; and $L_2$ is absent or H. Preferably, a bis-quaternized compound has the formula (III) wherein $R_1$ and $R_2$ are each independently $C_{16}$-$C_{18}$ alkyl; $R_4$ is —$C_2H_2$—; x is 2; y is 1; n is 0; $L_1$ is —COOH, —$SO_3H$, or —$PO_3H_2$ and $L_2$ is absent or H.

The corrosion inhibitor can be a quaternary ammonium compound of Formula (IV):

(IV)

wherein $R_1$, $R_2$, and $R_3$ are independently $C_1$ to $C_{20}$ alkyl, $R_4$ is methyl or benzyl, and $X^{31}$ is a halide or methosulfate.

Suitable alkyl, hydroxyalkyl, alkylaryl, arylalkyl or aryl amine quaternary salts include those alkylaryl, arylalkyl and aryl amine quaternary salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I. For the quaternary salts, $R^{5a}$, $R^{6a}$, $R^{7a}$, and $R^{8a}$ can each be independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula $[N^+R^{5a}R^{6a}R^{7a}R^{8a}][X^-]$ wherein $R^{5a}$, $R^{6a}$, $R^{7a}$, and $R^{8a}$ to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The corrosion inhibitor component can comprise a pyridinium salt such as those represented by Formula (V):

(V)

wherein $R^9$ is an alkyl group, an aryl group, or an arylalkyl group, wherein said alkyl groups have from 1 to about 18 carbon atoms and $X^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The corrosion inhibitor components can also include phosphate esters, monomeric or oligomeric fatty acids, or alkoxylated amines.

The corrosion inhibitor component can comprise a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor component can include a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The corrosion inhibitor component can comprise an alkoxylated amine. The alkoxylated amine can be an ethoxylated alkyl amine. The alkoxylated amine can be ethoxylated tallow amine.

The component of the composition can comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. The organic sulfur compound can constitute 0.5 to 15 wt. % of the composition, based on total weight of the composition, preferably about 1 to about 10 wt. % and more preferably about 1 to about 5 wt. %. The organic sulfur compound can constitute 1, 2, 3, 4, 5, 6, 7, 8, 9, 10, 11, 12, 13, 14 or 15 wt. % of the composition.

The composition can be substantially free of or free of any organic sulfur compound other than the compound of formula (1). A composition is substantially free of any organic sulfur compound if it contains an amount of organic sulfur compound below the amount that will produce hydrogen sulfide gas upon storage at a temperature of 25° C. and ambient pressure.

The composition can comprise a demulsifier. Preferably, the demulsifier comprises an oxyalkylate polymer, such as a polyalkylene glycol. The demulsifier can constitute from about 0.1 to 10 wt. %, from about 0.5 to 5 wt. %, or from about 0.5 to 4 wt. % of the composition, based on total weight of the composition. The demulsifier can constitute 0.5, 1, 1.5, 2, 2.5, 3, 3.5, 4, 4.5 or 5 wt. % of the composition.

The composition can include an additional asphaltene inhibitor. The composition can comprise from about 0.1 to 10 wt. %, from about 0.1 to 5 wt. %, or from about 0.5 to 4 wt. % of an additional asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The composition can include a paraffin inhibitor. The composition can comprise from about 0.1 to 10 wt. %, from about 0.1 to 5 wt. %, or from about 0.5 to 4 wt. % of a paraffin inhibitor, based on total weight of the composition. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The composition can include a scale inhibitor. The composition can comprise from about 0.1 to 20 wt. %, from about 0.5 to 10 wt. %, or from about 1 to 10 wt. % of a scale inhibitor, based on total weight of the composition. Suitable scale inhibitors include, but are not limited to, phosphates, phosphate esters, phosphoric acids, phosphonates, phosphonic acids, polyacrylam ides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

The composition can include an emulsifier. The composition can comprise from about 0.1 to 10 wt. %, from about 0.5 to 5 wt. %, or from about 0.5 to 4 wt. % of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

The composition can include a water clarifier. The composition can comprise from about 0.1 to 10 wt. %, from about 0.5 to 5 wt. %, or from about 0.5 to 4 wt. % of a water clarifier, based on total weight of the composition. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The composition can include a dispersant. The composition can comprise from about 0.1 to 10 wt. %, from about 0.5 to 5 wt. %, or from about 0.5 to 4 wt. % of a dispersant, based on total weight of the composition. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The composition can include an emulsion breaker. The composition can comprise from about 0.1 to 10 wt. %, from about 0.5 to 5 wt. %, or from about 0.5 to 4 wt. % of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, anionic, cationic and nonionic surfactants, and resins, such as phenolic and epoxide resins.

The composition can include a hydrogen sulfide scavenger. The composition can comprise from about 1 to 50 wt. %, from about 1 to 40 wt. %, or from about 1 to 30 wt. % of a hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The composition can include a gas hydrate inhibitor. The composition can comprise from about 0.1 to 25 wt. %, from about 0.1 to 20 wt. %, or from about 0.3 to 20 wt. % of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The composition can include a kinetic hydrate inhibitor. The composition can comprise from about 5 to 30 wt. %, from about 5 to 25 wt. %, or from about 10 to 25 wt. % of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

The composition can include a biocide. The composition can comprise from about 0.1 to 10 wt. %, from about 0.5 to 5 wt. %, or from about 0.5 to 4 wt. % of a biocide, based on total weight of the composition. Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

The composition can include a pH modifier. The composition can comprise from about 0.1 to 20 wt. %, from about 0.5 to 10 wt. %, or from about 0.5 to 5 wt. % of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The composition can include a surfactant. The composition can comprise from about 0.1 to 10 wt. %, from about 0.5 to 5 wt. %, or from about 0.5 to 4 wt. % of a surfactant, based on total weight of the composition. Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis (2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkylim inodipropionate.

Anti-corrosion compositions made according to the invention can further include additional functional agents or additives that provide a beneficial property. Anti-corrosion compositions of the invention may include any combination of the following additional agents or additives. Such additional agents or additives include sequestrants, solubilizers, lubricants, buffers, cleaning agents, rinse aids, preservatives, binders, thickeners or other viscosity modifiers, processing aids, carriers, water-conditioning agents, foam inhibitors or foam generators, threshold agents or systems, aesthetic enhancing agents (i.e., dyes, odorants, perfumes), or other additives suitable for formulation with a corrosion inhibitor composition, and mixtures thereof. Additional agents or additives will vary according to the particular corrosion inhibitor composition being manufactured and its intended use as one skilled in the art will appreciate.

Alternatively, the compositions may be devoid of any of the additional agents or additives.

Additionally, the asphaltene-inhibiting composition can be formulated into a treatment fluid comprising the following components. These formulations include the ranges of the components listed and can optionally include additional agents.

As used herein, the term "asphaltene" refers to a class of hydrocarbons in carbonaceous material, such as crude oil, bitumen, or coal that is soluble in toluene, xylene, and

| Component | 1 | 2 | 3 | 4 | 5 | 6 | 7 | 8 | 9 | 10 | 11 | 12 |
|---|---|---|---|---|---|---|---|---|---|---|---|---|
| Polymer of Formula 1 (wt. %) | 10-90 | 10-90 | 10-90 | 10-90 | 10-90 | 10-90 | 25-85 | 25-85 | 25-85 | 25-85 | 25-85 | 10-90 |
| Organic solvent (wt. %) | 10-35 | | | | | | 10-35 | | | | | 10-35 |
| Corrosion inhibitor (wt. %) | 0.1-20 | 0.1-20 | | | | | 0.1-20 | 0.1-20 | | | | 0.1-20 |
| Additional Asphaltene inhibitor (wt. %) | 0.1-5 | 0.1-5 | 0.1-5 | 0.1-5 | | | 0.1-5 | 0.1-5 | 0.1-5 | | | 0.1-5 |
| Paraffin inhibitor (wt. %) | | | | | | | | | | | | |
| Scale inhibitor (wt. %) | 1-10 | 1-10 | 1-10 | 1-10 | 1-10 | | 1-10 | 1-10 | 1-10 | 1-10 | | 1-10 |
| Emulsifier (wt. %) | | | | | | | | | | | | |
| Water clarifier (wt. %) | | | | | | | | | | | | |
| Dispersant (wt. %) | | | | | | | | | | | | |
| Emulsion breaker (wt. %) | | | | | | | | | | | | |
| Gas hydrate inhibitor (wt. %) | | | | | | | | | | | | 0.1-25 |
| Biocide (wt. %) | 0.5-5 | 0.5-5 | 0.5-5 | 0.5-5 | 0.5-5 | 0.5-5 | 0.5-5 | 0.5-5 | 0.5-5 | 0.5-5 | 0.5-5 | |

| Component | 13 | 14 | 15 | 16 | 17 | 18 | 19 | 20 | 21 | 22 | 23 | 24 |
|---|---|---|---|---|---|---|---|---|---|---|---|---|
| Polymer of Formula 1 (wt. %) | 10-90 | 10-90 | 10-90 | 10-90 | 10-90 | 10-90 | 25-85 | 25-85 | 25-85 | 25-85 | 25-85 | 25-85 |
| Organic solvent (wt. %) | | | | | | | | | | | | |
| Corrosion inhibitor (wt. %) | 0.1-20 | 0.1-20 | 0.1-20 | 0.1-20 | 0.1-20 | 0.1-20 | 0.1-20 | 0.1-20 | 0.1-20 | 0.1-20 | 0.1-20 | 0.1-20 |
| Additional Asphaltene inhibitor (wt. %) | 0.1-5 | | | | | | 0.1-5 | | | | | |
| Paraffin inhibitor (wt. %) | | | | | | | | | | | | |
| Scale inhibitor (wt. %) | 1-10 | 1-10 | | | 1-10 | | 1-10 | 1-10 | | | | 1-10 |
| Emulsifier (wt. %) | | | | | | | | | | | | |
| Water clarifier (wt. %) | | | | | | | | | | | | |
| Dispersant (wt. %) | | | | | | | | | | | | |
| Emulsion breaker (wt. %) | | | | | | | | | | | | |
| Gas hydrate inhibitor (wt. %) | 0.1-25 | 0.1-25 | 0.1-25 | | | | 0.1-25 | 0.1-25 | 0.1-25 | | 0.1-25 | |
| Biocide (wt. %) | | | | | 0.5-5 | 0.5-5 | 0.5-5 | 0.5-5 | 0.5-5 | 0.5-5 | | |

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., arylalkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl functional groups.

"Arylalkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

benzene, yet insoluble in n-alkanes, e.g., n-heptane and n-pentane. Asphaltenes are generally characterized by fused ring aromaticity with some small aliphatic side chains, and typically some polar heteroatom-containing functional groups, e.g., carboxylic acids, carbonyl, phenol, pyrroles, and pyridines, capable of donating or accepting protons intermolecularly and/or intramolecularly, having a molar H/C ratio of about 1 to 1.2, and a N, S, and O content of a low weight percent.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON($R_A$)($R_B$), wherein $R_A$ and $R_B$ are independently hydrogen, alkyl, or aryl), amino(—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

Having described the invention in detail, it will be apparent that modifications and variations are possible without departing from the scope of the invention defined in the appended claims.

EXAMPLES

The following non-limiting examples are provided to further illustrate the present invention.

Example 1: Synthesis of 4-(octyloxy)phenol

The synthesis of 4-(octyloxy)phenol was completed using the reagents specified in Table 1.

TABLE 1

| Reagent | Molecular Weight (g/mol) | Weight (g) | Weight (mol) | Mol reagent/ mol hydro- quinone |
|---|---|---|---|---|
| Hydroquinone | 110.11 | 200 | 1.82 | 1.00 |
| 1-bromooctane | 193.12 | 293 | 1.52 | 0.84 |
| Potassium hydroxide | 56.10 | 100 | 2.00 | 0.98 |
| Potassium iodide | 166.02 | 0.2 | 0.001 | |
| Ethanol (reagent grade) | | 1200 | | |

Dichloromethane, hexanes, distilled water, and concentrated hydrochloric acid were also used. Ethanol was charged to a 3-L four-necked reactor equipped with an overhead stirrer, nitrogen purge, temperature probe, a dropping funnel, and a condenser. The overhead stirrer was adjusted to a speed of approximately 500 rpm. A very slow nitrogen purge was started. Potassium hydroxide pellets were charged to the reactor. The reactor was heated to 40° C. and held for 30 minutes. Hydroquinone and potassium iodide were charged to the reactor and the reaction temperature was increased to 65° C.

Into a dropping funnel was charged 1-bromooctane, which was added into the reactor over a period of three hours, while maintaining stirring and temperature of 65° C. Stirring was continued at 65° C. until no 1-bromooctane was left in the solution as monitored by GC-MS. This process typically requires 8-10 hours.

The reaction was subsequently cooled to room temperature and acidified to a pH of 2.0 with concentrated hydrochloric acid. Approximately 300 mL deionized (DI) water was added and the reaction mixture was stirred for 15 minutes. The reaction mixture was extracted twice with 200 mL dichloromethane. The combined organic phase was then washed three times with 200 mL DI water, dried over $Na_2SO_4$, and concentrated in vacuo to provide off-white solids. The crude solids were washed with minimum amounts of cold hexanes to provide pure 4-(octyloxy)phenol. The sample was dried in a 40° C. oven.

Example 2: Reaction of 4-(octyloxy)phenol and Paraformaldehyde

The following reagents and amounts thereof were used in the reaction: 250 g (1.12 mol) 4-(octyloxy)phenol; 33.65 g (1.12 mol.) paraformaldehyde, divided into two equal parts of 16.82 g; 300 g heavy aromatic naphtha; 2.33 g branched dodecylbenzenesulfonic acid (DDBSA).

To a 1 L four-necked round bottom flask was added 4-(octyloxy)phenol, heavy aromatic naphtha, and branched DDBSA; the flask was equipped with an overhead stirrer, $N_2$ purge, temperature probe, and Dean-Stark trap with condenser. The overhead stirrer was started along with a very slow nitrogen purge (approximately one bubble per five seconds). Water was turned on to the condenser. In the case of small scale reactions (less than 100 g total), the Dean-Stark trap was filled with heavy aromatic naphtha.

The reaction flask was heated to 65° C. Once a consistent temperature of 65° C. was achieved, the first charge of paraformaldehyde was added. The temperature was recorded every 30 seconds until the exotherm stopped and the reactor cooled 4-5° C. from the maximum exotherm for a 15-20° C. exotherm. The reactor was returned to 65° C.

Once a temperature of 65° C. was attained, the second charge of paraformaldehyde was added. The temperature was recorded every 30 seconds until exotherm was reached and the reactor cooled 1-3° C. from the maximum exotherm for a 1-10° C. exotherm. The temperature was subsequently increased to 95° C. Once the reaction mixture achieved 95° C., and held at this temperature for three hours. As each hour elapsed during the period within which the temperature was maintained at 95° C., a 2-3 mL aliquot of the reaction mixture was removed. At the end of the three hours, the temperature was increased to 180° C. or reflux temperature. The reaction flask and the Dean-Stark trap arm were wrapped with glass wool and aluminum foil to minimize heating needed to reflux. At reflux temperature, the reaction was held for three hours. For every interval of 1 hour, a 2-3 mL aliquot of the reaction mixture was removed. At the end of the three-hour reaction period, the reaction was left to cool overnight. The amount of water removed was recorded. When the reaction mixture was cooled, was transferred into a tare bottle. The weight of the sample recovered was recorded.

Example 3: Efficacy of Non-Alkylphenol Resin Compositions of the Current Invention as Dispersants on FCC Slurries Asphaltene deposition is a common fouling mechanism observed in refinery heat exchanger networks. Fouling occurs over a time period that may vary from months to years depending on the unit being considered. In the asphaltene dispersancy test (ADT) the fouling is simulated in minutes instead of months.

The ADT provides a rapid method to discern dispersant performance on a specific asphaltene containing material. The basis of the ADT is to determine relative effectiveness of dispersants in keeping asphaltenes dispersed in a non-solvent medium. The "RFM_ADT" test method is applied to other asphaltene and/or paraffinic (P), naphthenic (N), aromatic (A), collectively called PNA materials, such as vistar and FCC slurry, to test the performance of the dispersants.

The ADT takes advantage of the insolubility of asphaltenes in alkane diluent (e.g., a paraffinic organic solvent). Dilution of a fixed volume of asphaltenic/PNA material in a fixed volume of alkane diluent results in precipitation of asphaltenes/PNA. Dilution of the same fixed volume of asphaltenic/PNA material properly dosed with dispersant in the same fixed volume of alkane diluent results in minimal precipitation of asphaltenes during a controlled testing period. An effective dispersant will prevent the agglomeration and eventual precipitation of asphaltenes when the sample is diluted in alkane diluent. Thus, the desired result is low to no precipitation of the asphaltenes of PNA materials and the samples having the least deposition (most dispersion) of these materials showed the best results.

Two experiments were tested on FCC slurries obtained from two refineries. The resins tested are listed in Table 3 along with their MW and % non-volatile residue (NVR).

| Sample ID | MW (Daltons) | NVR (%) |
|---|---|---|
| Resin 1 | 7,700 | 46.95 |
| Resin 2 | 3,800 | 45.52 |
| Resin 3 | 5,200 | 51.20 |

Experimental resins were tested alongside THERMOGAIN®, a baseline dispersant chemistry program sold by Nalco-Champion (An Ecolab Company). These tests showed that Resin 1 with the molecular weight of 7700 daltons showed no agglomeration of precipitation and provided at least equivalent or better performance than THERMOGAIN®. As compared to the blank, all of the resins (e.g., Resin 1, Resin 2, and Resin 3) showed less agglomeration and precipitation as compared to the blank and Resin 1 showed the best dispersancy followed by Resin 2 and then Resin 3.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be evident that the several objects of the invention are achieved and other advantageous results attained.

As various changes can be made in the above polymers, compositions, processes, and methods without departing from the scope of the invention, it is intended that all matter contained in the above description shall be interpreted as illustrative and not in a limiting sense.

The invention claimed is:

1. A method for dispersing asphaltene in an asphaltene-containing hydrocarbon comprising contacting the asphaltene-containing hydrocarbon with an asphaltene-inhibiting composition comprising a polymer corresponding in structure to Formula (1):

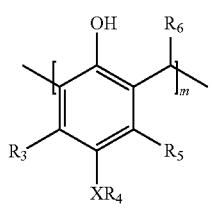

(1)

wherein:
$R_3$ and $R_5$ are independently hydrogen, $C_1$-$C_{22}$ alkyl, or alkyloxy;
$R_4$ is $C_4$-$C_{22}$ alkyl;
$R_6$ is hydrogen, alkyl, aryl, or arylalkyl;
X is —O— or —$NR_8$;
$R_8$ is hydrogen or $C_1$-$C_4$ alkyl; and
m is an integer from 4 to 75.

2. The method of claim 1, wherein the asphaltene is further inhibited from deposition.

3. The method of claim 1, wherein the polymer corresponds in structure to Formula (1A):

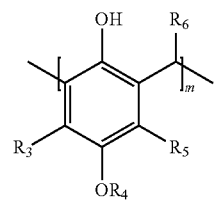

(1A)

$R_3$ and $R_5$ are independently hydrogen, $C_1$-$C_{22}$ alkyl, or alkyloxy;
$R_4$ is $C_4$-$C_{22}$ alkyl;
$R_6$ is hydrogen, alkyl, aryl, or arylalkyl; and
m is an integer from 4 to 75.

4. The method of claim 3, wherein $R_4$ is $C_4$-$C_{24}$ alkyl.
5. The method of claim 3, wherein $R_4$ is $C_8$-$C_{16}$ alkyl.
6. The method of claim 3, wherein $R_4$ is $C_8$-$C_{12}$ alkyl.
7. The method of claim 3, wherein $R_4$ is octyl.
8. The method of claim 3, wherein $R_3$ and $R_5$ are independently hydrogen or $C_1$ to $C_6$ alkyl.
9. The method of claim 3, wherein $R_3$ and $R_5$ are independently hydrogen or methyl.
10. The method of claim 3, wherein $R_3$ and $R_5$ are hydrogen.
11. The method of claim 3, wherein $R_6$ is hydrogen, methyl, butyl, or benzyl.
12. The method of claim 11, wherein $R_6$ is methyl.
13. The method of claim 11, wherein $R_6$ is hydrogen.
14. The method of claim 3, wherein the polymer has a weight average molecular weight of from about 500 Daltons to about 25,000 Daltons.
15. The method of claim 3, wherein the polymer has a weight average molecular weight of from about 2000 Daltons to about 10,000 Daltons.
16. The method of claim 3, wherein the asphaltene-inhibiting composition comprises from about 10 wt. % to about 90 wt. % of the polymer corresponding in structure to Formula 1 and the balance being a hydrophobic solvent.
17. The method of claim 16, wherein the hydrophobic solvent comprises toluene, xylene, an ethylbenzene, an aromatic naphtha, a produced hydrocarbon, diesel, kerosene, or a combination thereof.
18. The method of claim 3, wherein the asphaltene-inhibiting composition is contacted with the asphaltene-containing hydrocarbon in an effective amount to disperse asphaltene.
19. The method of claim 18, wherein the effective amount of the asphaltene-inhibiting composition is from about 1 ppm to about 1000 ppm of the polymer corresponding in structure to Formula 1 based on the total amount of a fluid containing the asphaltene-containing hydrocarbon.
20. The method of claim 19, wherein the effective amount of the polymer corresponding in structure to Formula 1 is from about 1 ppm to about 100 ppm.

* * * * *